(12) United States Patent
Kashio et al.

(10) Patent No.: US 7,602,306 B2
(45) Date of Patent: Oct. 13, 2009

(54) APPARATUS FOR MONITORING JOINTS OF ARTICULATED ROBOT

(75) Inventors: Eiji Kashio, Saitama (JP); Yoshinobu Sugita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 399 days.

(21) Appl. No.: 11/719,729

(22) PCT Filed: Jun. 22, 2006

(86) PCT No.: PCT/JP2006/012935

§ 371 (c)(1),
(2), (4) Date: May 18, 2007

(87) PCT Pub. No.: WO2007/001037

PCT Pub. Date: Jan. 4, 2007

(65) Prior Publication Data

US 2009/0179766 A1    Jul. 16, 2009

(30) Foreign Application Priority Data

Jun. 29, 2005    (JP) .............................. 2005-190358

(51) Int. Cl.
*G08B 21/00*    (2006.01)
*B25J 19/00*    (2006.01)

(52) U.S. Cl. .............. 340/686.1; 340/686.6; 340/686.3; 901/35; 318/568.24

(58) Field of Classification Search .............. 340/686.1, 340/686.3, 686.6; 901/10, 15, 28, 35; 318/568.11, 318/568.16, 568.24, 568.25
See application file for complete search history.

(56) References Cited

U.S. PATENT DOCUMENTS

| | | | | |
|---|---|---|---|---|
| 4,618,822 | A * | 10/1986 | Hansen | 324/207.16 |
| 5,049,797 | A * | 9/1991 | Phillips | 318/568.16 |
| 5,954,692 | A * | 9/1999 | Smith et al. | 604/95.01 |
| 6,741,182 | B1 * | 5/2004 | Smith et al. | 340/664 |
| 6,995,536 | B2 * | 2/2006 | Challoner | 318/568.21 |

FOREIGN PATENT DOCUMENTS

| | | |
|---|---|---|
| JP | 06-071581 A | 3/1994 |
| JP | 7-116975 A | 5/1995 |
| JP | 7-164362 A | 6/1995 |
| JP | 2002-310646 A | 10/2002 |

* cited by examiner

*Primary Examiner*—Jennifer Mehmood
(74) *Attorney, Agent, or Firm*—Standley Law Group LLP

(57) ABSTRACT

An apparatus for monitoring the operation of a robot joint in which a second member (43) is displaceably mounted on a first member (41). The distance to a measurement plate provided to the second member (43) is measured by a range finder (42) provided to the first member (41). A monitoring unit (71) compares the distance data measured by the range finder with a reference distance stored in advance, and generates an abnormality signal when the difference between the distance data and the reference distance exceeds an allowable value.

4 Claims, 6 Drawing Sheets

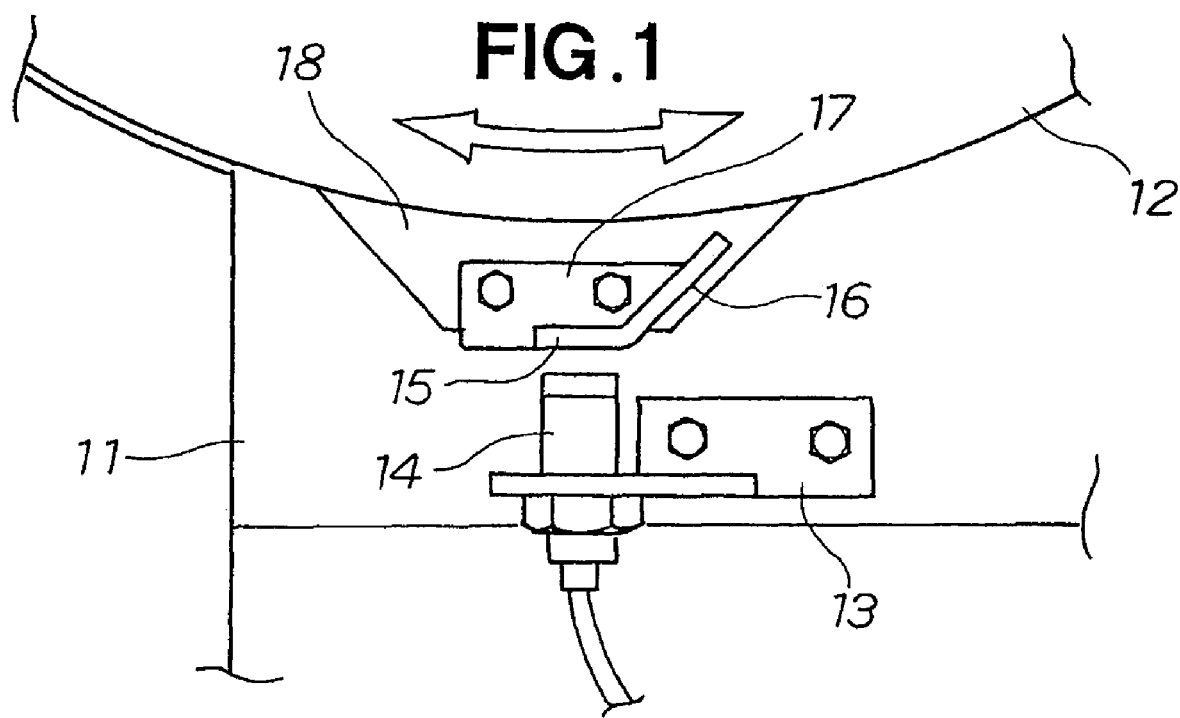

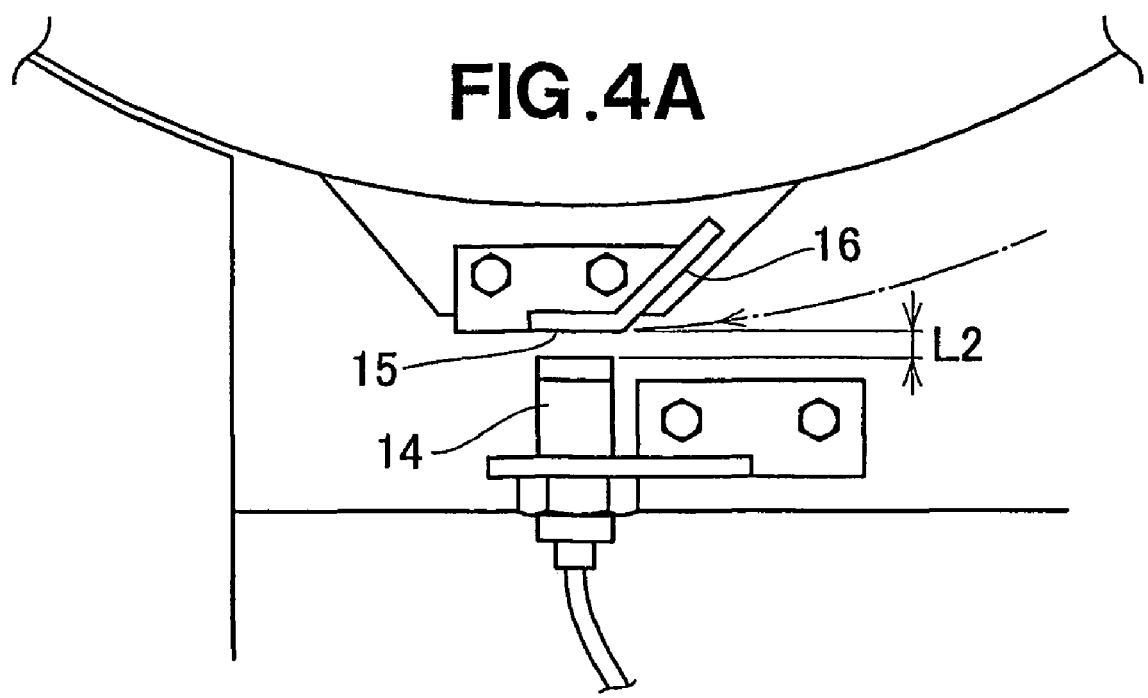
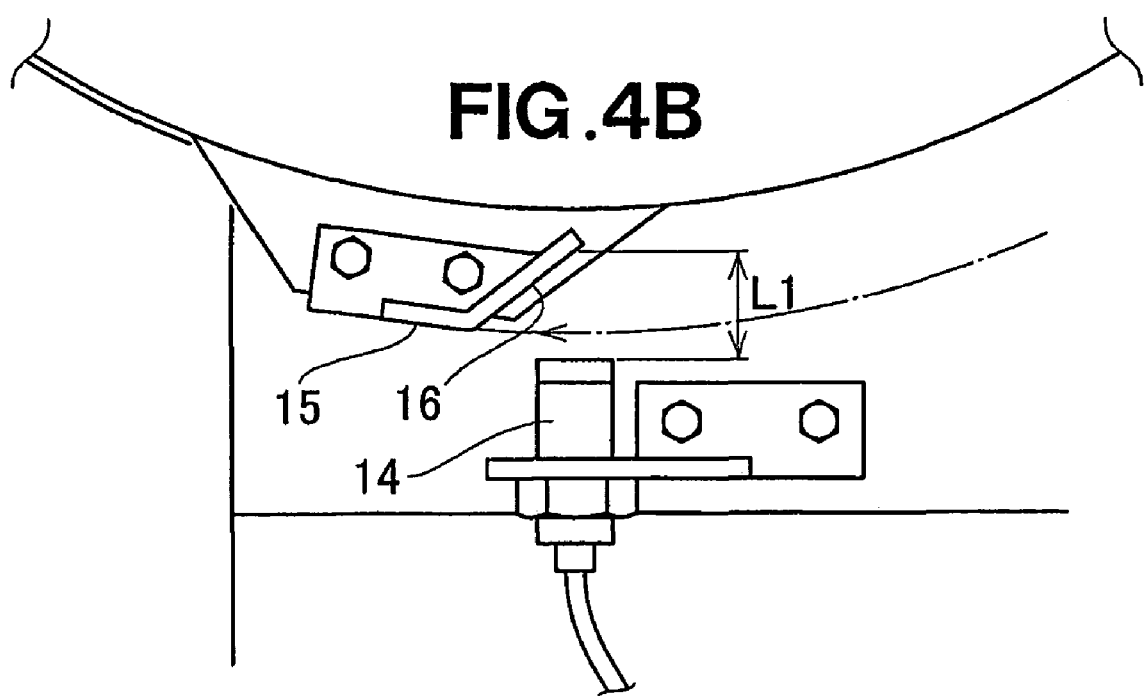

APPARATUS FOR MONITORING JOINTS OF ARTICULATED ROBOT

CROSS REFERENCE TO RELATED APPLICATIONS

This application claims the benefit of national stage entry of PCT/JP2006/312935, filed on Jun. 22, 2006, claiming the benefit of JP 2005-190358 filed on Jun. 29, 2005.

TECHNICAL FIELD

The present invention relates to an apparatus for monitoring the joints of an articulated robot.

BACKGROUND ART

Automobile assembly lines are provided, for example, with articulated robots such as the one disclosed in Japanese Patent Laid-Open Publication No. 6-71581. Articulated robots have servomotors and decelerators provided to all of the joints, and the joints can therefore be operated independently.

When problems occur with the bearing that supports the motor axle or the decelerator axle in a servomotor or a decelerator, the motor axle or the decelerator axle does not rotate smoothly. When the axle does not rotate smoothly, the distal end of the robot arm is displaced from a target position.

Since it is not difficult to detect the positional displacement, any malfunction in the articulated robot can be easily detected. However, in such cases, it is not possible to identify which joint among multiple joints is undergoing problems. If the articulated robot has six joints, the robot must be stopped, and a series of failure prevention measures must be taken for each of six locations. In these measures, the servomotors or the decelerators are inspected, the breakdown locations are pinpointed, parts are replaced, and teaching and positional corrections are carried out. This series of failure prevention measures is time consuming and therefore leads to a decrease in productivity.

In view of this, a need has arisen to develop an apparatus for monitoring the joints of an articulated robot, wherein it is possible to specify which joint is undergoing problems.

DISCLOSURE OF THE INVENTION

According to an aspect of the present invention, there is provided an apparatus for monitoring the joints of an articulated robot in which the joints of a robot in which a second member is displaceably mounted on a first member are monitored for normal or abnormal operation, wherein the apparatus comprises a range finder provided on the first member; a measurement plate that is provided on the second member and that is measured by the range finder; and a monitoring unit for comparing the distance data measured by the range finder with a reference distance stored in advance, and producing an abnormality signal when the difference between the distance data and the reference data exceeds an allowable value.

A range finder and a measurement plate are mounted on each joint of the robot, the difference between the distance data measured by each range finder and a reference distance is determined, and an abnormality signal is produced by the monitoring unit when this difference exceeds an allowable value. In each joint, an abnormality signal can be obtained, the problem location can be specified at the same time as the abnormality arises, and measures can be taken quickly for the specified joint.

Preferably, the range finder comprises an eddy-current range finder. For example, in welding processes, transparent smoke referred to as welding fumes is produced. When an optical range sensor is used in such processes, either the distance cannot be measured or the measured value has reduced reliability. Also, intense light referred to as arc light is produced during welding. Therefore, the arc light may be received by the optical range sensor, causing erroneous operation. An eddy current range sensor, on the other hand, is unlikely to be affected by welding fumes or arc light, and the joints of a welding robot can be monitored with a high degree of precision.

In a preferred form, the monitoring unit comprises an observation monitor that displays warning information when the abnormality signal is produced.

The monitoring unit for monitoring the joints of an articulated robot may have a warning light that lights up when the abnormality signal is produced.

BRIEF DESCRIPTION OF THE DRAWINGS

Certain preferred embodiments of the present invention will be described in detail below, by way of example only, with reference to the accompanying drawings, in which:

FIG. 1 shows a mounted range finder component of the present invention;

FIGS. 4A and 4B are explanatory diagrams of the operation in FIG. 1;

BEST MODE FOR CARRYING OUT THE INVENTION

Figure 2A:
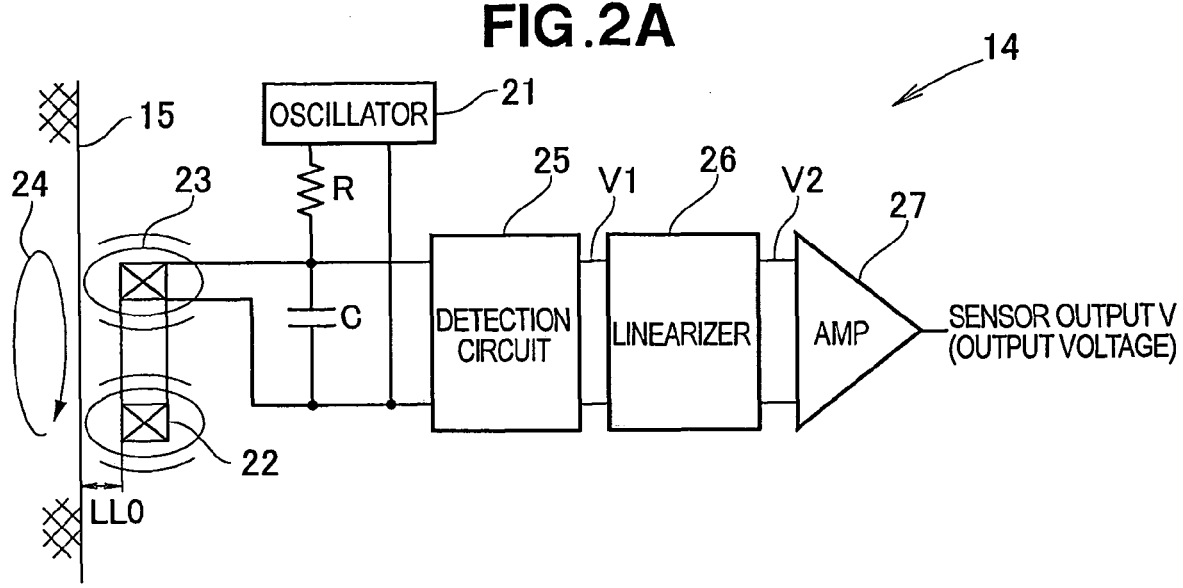
FIGS. 2A and 2B are conceptual diagrams depicting the range finder shown in FIG. 1.

In FIG. 1, when a second member 12 is rotated in relation to a first member 11 as shown by the arrows, a range finder 14 is mounted on the first member 11 by means of a bracket 13. Also, a member 17 comprising a slanted part 16 and a measurement plate 15 that is disposed to face the range finder 14 is mounted on the second member 12 by means of a bracket 18. The measurement plate 15 is formed, for example, from a metal material that produces an eddy current.

Next, the principle of operation of the range finder 14 will be described.

As shown in FIG. 2A, a high-frequency current is supplied to a sensor coil 22 by an oscillator 21 in the range finder 14. A high-frequency magnetic field 23 is then created in the center coil 22. As the distance LL0 between the center coil 22 and the measurement plate 15 decreases, the effects of the high-frequency magnetic field 23 increase, and an eddy current 24 created in the measurement plate 15 increases.

The impedance of the sensor coil 22 varies under the effects of the eddy current 24. A voltage variation based on this variation in impedance is induced in an LC resonance circuit composed of the sensor coil 22 and a capacitor C. The induced voltage variation is detected at a high frequency by a detection circuit 25. The voltage V1 detected at a high frequency is converted by a linearizer 26 to a voltage V2 that is proportionate to the displacement of the distance LL0. This voltage V2 is amplified by an amplifier 27, and this amplified voltage is obtained as sensor output (output voltage) V.

Figure 2B:
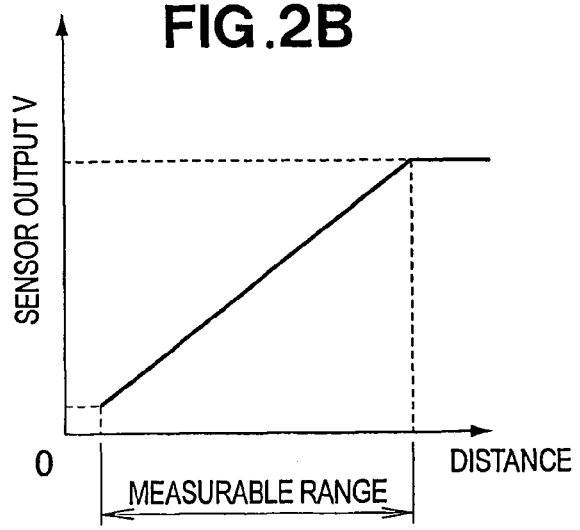

As a result, a graph depicting the relationship between distance and sensor output is obtained, as shown in FIG. 2B. A measurable distance is naturally established for the sensor, and the distance can therefore be determined based on the sensor output because the sensor output is proportionate to the distance within the measurable range.

Figure 3:
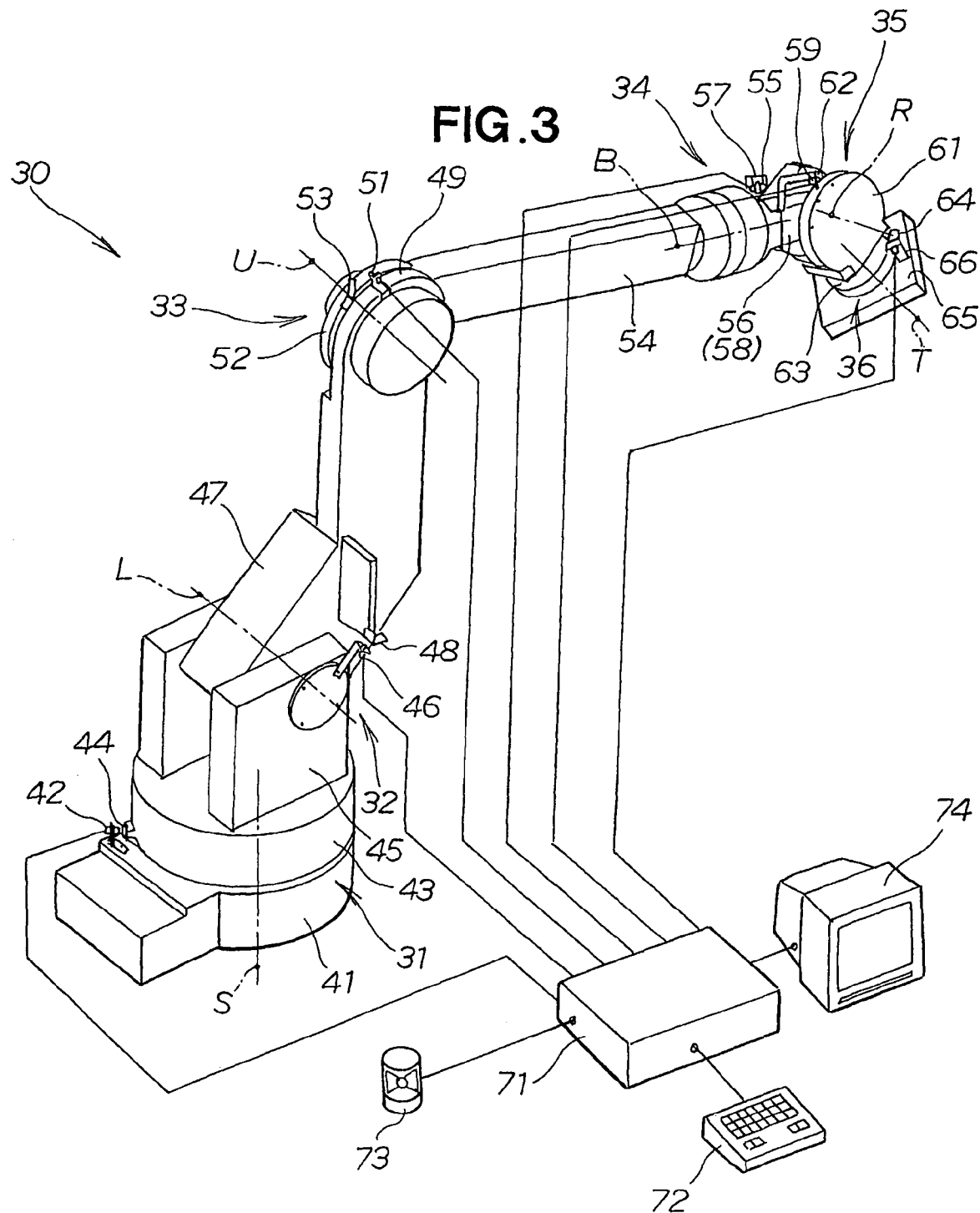
FIG. 3 is a perspective view of a robot including an apparatus for monitoring the joints of an articulated robot according to the present invention.

A specific example wherein the range finder 14 described above is mounted on a joint of an articulated robot is described in FIG. 3.

In FIG. 3, an articulated robot 30 is a six-axis robot having an S-axis joint 31, an L axis joint 32, a U-axis joint 33, a B-axis joint 34, an R-axis joint 35, and a T-axis joint 36. An S-axis range finder 42 is mounted on an S-axis first member 41, an S-axis measurement plate 44 is mounted on an S-axis second member 43. Similarly, an L axis range finder 46 is mounted on an L axis first member 45, an L axis measurement plate 48 is mounted on an L axis second member 47, a U-axis range finder 51 is mounted on a U-axis first member 49, a U-axis measurement plate 53 is mounted on a U-axis second member 52, a B-axis range finder 55 is mounted on a B-axis first member 54, a B-axis measurement plate 57 is mounted on a B-axis second member 56, an R-axis range finder 59 is mounted on an R-axis first member 58, an R-axis measurement plate 62 is mounted on an R-axis second member 61, a T-axis range finder 64 is mounted on a T-axis first member 63, and a T-axis measurement plate 66 is mounted on a T-axis second member 65.

The distance data obtained by the range finders 42, 46, 51, 55, 59, 64 is collected in a monitoring unit 71. The monitoring unit 71 is equipped with an input unit 72 for inputting reference distances established for each of the range finders 42, 46, 51, 55, 59, 64 into the monitoring unit 71 in advance; a warning light 73 that lights up based on an abnormality signal that is produced by the monitoring unit 71 when the difference from comparing the distance data with the reference distances exceeds an allowable value; and an observation monitor 74 for indicating that an abnormality signal has been produced.

Abnormal conditions and normal conditions are described in detail in the next diagrams.

In FIG. 4A, when a determination command is given, the range finder 14 is placed facing the measurement plate 15, and the measured distance is set at L2, which is equal to the reference distance. The determination command can be set to be given during standby mode, for example. Specifically, the robot goes into standby mode with a certain frequency, and the abnormal/normal determination is made by the monitoring unit 71 when the standby mode is reached.

If the bearing becomes worn away, then the motor axle or the decelerator axle does not rotate as designed. At this time, the range finder 14 cannot reach a position facing the measurement plate 15, as shown in FIG. 4B. For example, the range finder 14 may face the slanted part 16, and the measured distance data is set at L1.

The situation is determined to be normal if the difference between the distance data L1 and the reference distance L2 is equal to or less than an allowable value, and abnormal if the difference between the distance data L1 and the reference distance L2 exceeds the allowable value. Specifically, the determination is normal in FIG. 4A, and abnormal in FIG. 4B.

A control flow including the aforementioned determinations is described below.

Figure 5:
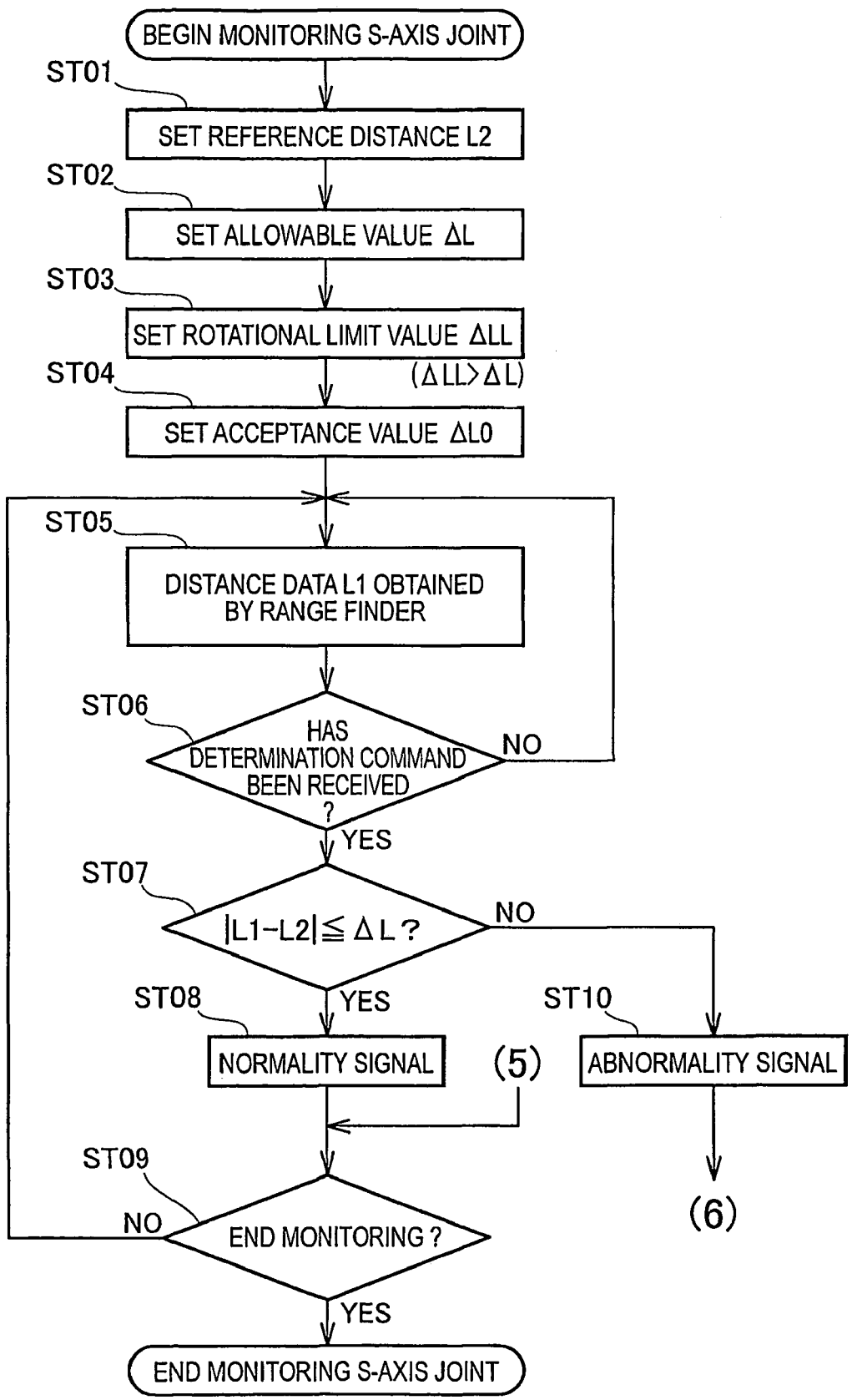
FIG. 5 is a control flowchart showing the manner in which the joints of a robot are monitored.

FIG. 5 is a control flowchart showing the manner in which the joints of a robot are monitored. The S-axis joint is described as an example of a joint, but the description applies to all of the other joints as well.

Step (hereinafter abbreviated as ST) 01: The reference distance L2 for the S axis is set in the monitoring unit 71 (FIG. 3) by using the input unit 72 (FIG. 3).

ST02: The allowable value ΔL for the S axis is set in the monitoring unit 71 (FIG. 3) by using the input unit 72 (FIG. 3).

ST03: A rotational limit value ΔLL for the S axis is set in the monitoring unit 71 (FIG. 3) by using the input unit 72 (FIG. 3). The rotational limit value ΔLL exceeds the allowable value ΔL, but is also a value at which rotation continues.

ST04: An acceptable value ΔL0 for the S axis is set in the monitoring unit 71 (FIG. 3) by using the input unit 72 (FIG. 3).

ST05: The distance data L1 is obtained by the S-axis range finder 42 (FIG. 3) and is transmitted to the monitoring unit 71 (FIG. 3).

ST06: The monitoring unit 71 (FIG. 3) determines whether a determination command has been received. If not, the process returns to ST05.

ST07: If the outcome in ST06 is positive, i.e., if a determination command has been received, then the monitoring unit 71 (FIG. 3) determines whether the difference between the distance data L1 and the reference distance L2 is within the allowable value ΔL.

ST08: The monitoring unit 71 (FIG. 3) generates a normality signal if the outcome in ST07 is positive.

ST09: A determination is made as to whether or not monitoring is to be ended, and the process returns to ST05 if the outcome is negative. Otherwise, the control flow is ended.

ST10: If the outcome in ST07 is negative, i.e., if the difference between the distance data L1 and the reference distance L2 exceeds the allowable value ΔL, then the monitoring unit 71 (FIG. 3) generates an abnormality signal and the process proceeds to the next diagram.

Figure 6:
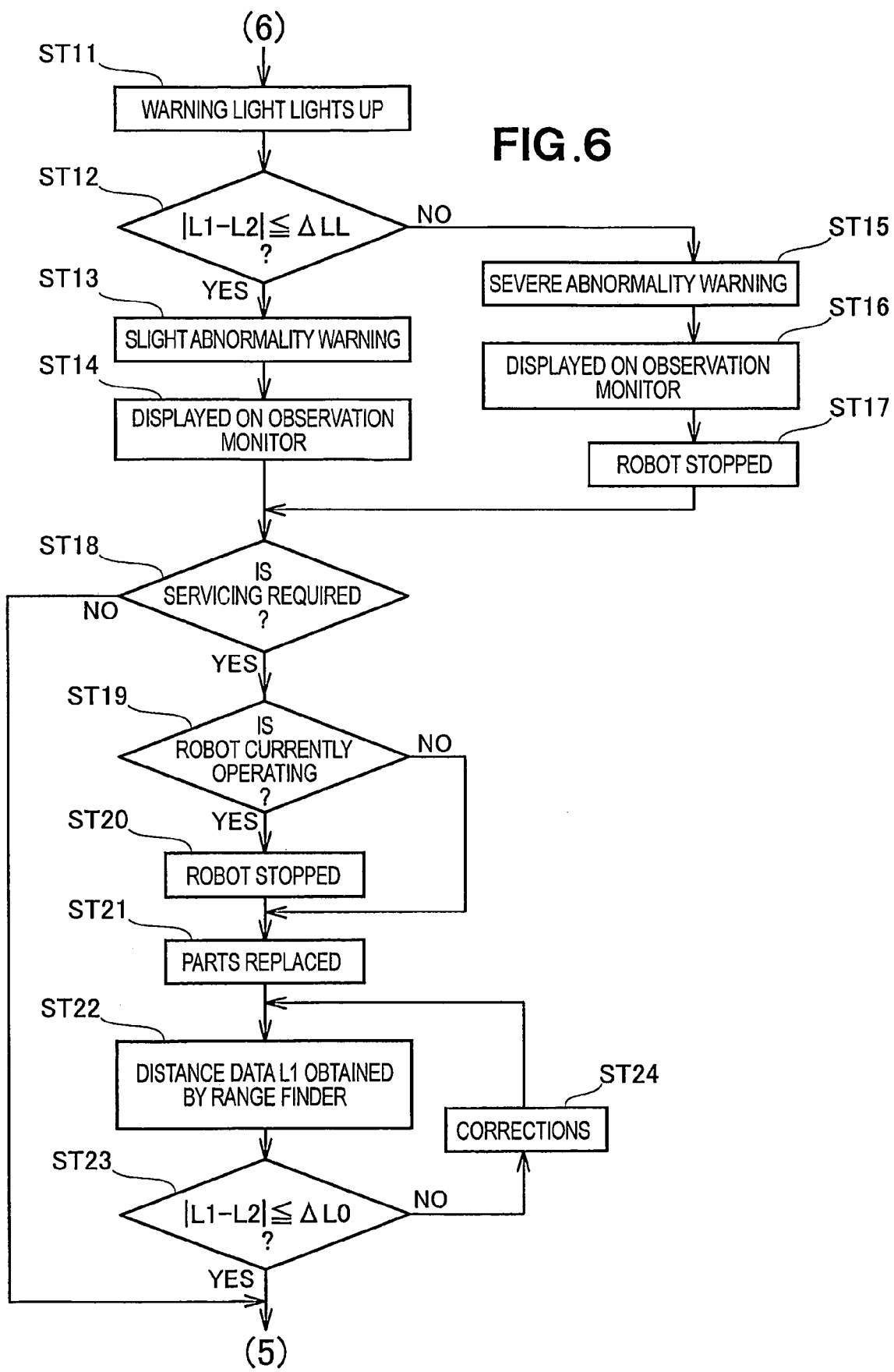
FIG. 6 is a control flowchart showing the manner in which the joints of a robot are monitored.

FIG. 6 is a control flowchart showing the manner in which the S-axis joint is monitored, and is a continuation of FIG. 5.

ST11: The warning light 73 (FIG. 3) lights up.

ST12: The monitoring unit 71 (FIG. 3) determines whether the difference between the distance data L1 and the reference distance L2 is within the rotational limit value ΔLL.

ST13: If the outcome in ST12 is positive, the monitoring unit 71 (FIG. 3) generates a slight abnormality warning.

ST14: The observation monitor 74 indicates that a slight abnormality has occurred (FIG. 3). For example, when a slight abnormality has occurred in the monitoring of the n axis, the words "slight abnormality in the n axis" are displayed. The letter n indicates the axis that is being monitored.

ST15: If the outcome in ST12 is negative, the monitoring unit 71 (FIG. 3) generates a severe abnormality warning.

ST16: The observation monitor 74 indicates that a severe abnormality has occurred (FIG. 3). For example, the words "severe abnormality in the n axis" is displayed when a severe abnormality has occurred in the monitoring of the n axis, similar to ST14.

ST17: The monitoring unit 71 (FIG. 3) then stops the robot.

ST18: An attendant determines whether servicing is required. If servicing is not required, the process returns to ST09 (FIG. 5).

ST19: A determination is made as to whether the robot is currently operating. If not, the process advances to ST21.

ST20: If the outcome in ST19 is positive, then the monitoring unit 71 (FIG. 3) stops the robot.

ST21: The attendant replaces parts.

ST22: When servicing is complete, the attendant returns the robot to operating mode. The range finder obtains the distance data L1.

ST23: The monitoring unit 71 (FIG. 3) determines whether the difference between the distance data L1 and the reference distance L2 is within the acceptable value ΔL0. If this outcome is positive, the process returns to ST09 (FIG. 5).

ST24: If the outcome in ST23 is negative, then corrections are made, and the process returns to ST22. The corrections are repeated until the process succeeds.

Specifically, a range finder and a measurement plate are mounted on each joint of a robot, the difference between the distance data measured by the range finder and a reference distance is determined, an abnormality signal is produced by the monitoring unit when this difference exceeds an allowable value, this abnormality signal is obtained for each of the joints, a warning light lights up to inform of the occurrence of a problem, and the location of the problem is displayed on an observation monitor, whereby the location of the problem can be specified at the same time as the abnormality occurs, and measures can be quickly taken to deal with the specified joint.

Also, since an eddy-current range finder is used, the joints of an articulated robot can be monitored with a high degree of precision even in cases when the joints would be difficult to monitor with an optical range sensor due to the effects of welding fumes and arc light.

In the described exemplary embodiment, range finders were installed on all of the joints, but it is also possible to install range finders on only some of the joints, such as installing range finders on the important joints and not on the other joints.

Also, instead of an eddy-current range finder, it is possible to use a laser displacement gauge, an electrostatic capacitance displacement gauge, an ultrasonic range finder, a laser range finder, or the like, and the range finder may be any type of these.

Furthermore, when an ultrasonic range finder is used, the measurement plate can still be measured if it is made of plastic or glass instead of a metal material, and the material can be varied according to the range finder that is used.

INDUSTRIAL APPLICABILITY

The present invention may be used in as an apparatus for monitoring the joints of an articulated robot, such as a welding robot or the like.

The invention claimed is:

1. An apparatus for monitoring joints of an articulated robot in which a second member is displaceably mounted on a first member, and the joints are monitored for normal or abnormal operation, said apparatus comprising:
   a range finder provided on the first member;
   a measurement plate provided on the second member, the distance between the range finder and the measurement plate measured by the range finder; and
   a monitoring unit for comparing the measured distance between the range finder and the measurement plate with a reference distance stored in advance, and for producing an abnormality signal when the difference between the measured distance and the reference distance exceeds an allowable value.

2. The monitoring apparatus of claim 1, wherein the range finder comprises an eddy-current range finder.

3. The monitoring apparatus of claim 1, wherein the monitoring unit comprises an observation monitor for displaying warning information when the abnormality signal is produced.

4. The monitoring apparatus of claim 1, wherein the monitoring unit comprises a warning light that lights up when the abnormality signal is produced.

* * * * *

UNITED STATES PATENT AND TRADEMARK OFFICE
CERTIFICATE OF CORRECTION

PATENT NO.        : 7,602,306 B2
APPLICATION NO.   : 11/719729
DATED             : October 13, 2009
INVENTOR(S)       : Kashio et al.

It is certified that error appears in the above-identified patent and that said Letters Patent is hereby corrected as shown below:

On the title page, section (86), please delete "PCT No.: PCT/JP2006/012935" and insert -- PCT No.: PCT/JP2006/312935 --.

In column 5, line 35, please delete "type".

In column 6, line 8, please delete "in".

Signed and Sealed this

Seventeenth Day of November, 2009

David J. Kappos
*Director of the United States Patent and Trademark Office*